(12) United States Patent
Gensior

(10) Patent No.: US 11,476,775 B2
(45) Date of Patent: Oct. 18, 2022

(54) METHOD FOR CONTROLLING A CONVERTER

(71) Applicant: Wobben Properties GmbH, Aurich (DE)

(72) Inventor: Albrecht Gensior, Dresden (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/354,485

(22) Filed: Jun. 22, 2021

(65) Prior Publication Data

US 2021/0408936 A1 Dec. 30, 2021

(30) Foreign Application Priority Data

Jun. 26, 2020 (EP) .................................... 20182525

(51) Int. Cl.
| | |
|---|---|
| *H02M 5/42* | (2006.01) |
| *H02M 5/44* | (2006.01) |
| *H02M 5/458* | (2006.01) |
| *H02M 7/493* | (2007.01) |
| *F03D 9/25* | (2016.01) |
| *H02M 1/00* | (2006.01) |

(Continued)

(52) U.S. Cl.
CPC .............. *H02M 7/493* (2013.01); *F03D 9/25* (2016.05); *H02J 3/381* (2013.01); *H02M 1/0009* (2021.05); *H02M 7/53871* (2013.01); *F05B 2220/706* (2013.01); *H02J 2300/28* (2020.01); *H02M 5/42* (2013.01); *H02M 5/44* (2013.01); *H02M 5/4585* (2013.01)

(58) Field of Classification Search
CPC ........ H02M 5/42; H02M 5/44; H02M 5/4585; H02M 7/48
See application file for complete search history.

(56) References Cited

U.S. PATENT DOCUMENTS

| | | | |
|---|---|---|---|
| 9,541,067 B2 * | 1/2017 | De Boer | ................. F03D 9/257 |
| 10,066,602 B2 * | 9/2018 | Beekmann | ................ H02J 3/24 |

(Continued)

FOREIGN PATENT DOCUMENTS

| | | |
|---|---|---|
| DE | 102016107614 A1 | 10/2017 |
| WO | 2016/045963 A1 | 3/2016 |
| WO | 2018/138184 A1 | 8/2018 |

*Primary Examiner* — Gary A Nash
(74) *Attorney, Agent, or Firm* — Seed IP Law Group LLP

(57) ABSTRACT

The present disclosure relates to a method for controlling a converter, in particular power converter of a wind power installation. The converter has a plurality of, preferably parallel, converter modules. The method includes the following steps: driving a first converter module, such that the converter module generates a first electrical AC current in a first switch position, driving a second converter module, such that the converter module generates a second electrical AC current in a second switch position, superposing the first electrical AC current and the second electrical AC current to form a total current, detecting the total current of the converter, determining a virtual current depending on the first and second switch positions, and changing the first switch position of the first converter module and/or the second switch position of the second converter module depending on the total current and the virtual current.

14 Claims, 5 Drawing Sheets

(51) Int. Cl.
*H02J 3/38* (2006.01)
*H02M 7/5387* (2007.01)

(56) References Cited

U.S. PATENT DOCUMENTS

| | | | |
|---|---|---|---|
| 2007/0121354 A1* | 5/2007 | Jones | H02P 9/102 363/67 |
| 2008/0150285 A1* | 6/2008 | Corcelles Pereira | H02P 9/007 322/23 |
| 2014/0175796 A1* | 6/2014 | Rasmussen | H02J 3/381 307/151 |
| 2016/0197559 A1* | 7/2016 | Tan | H02J 3/381 363/35 |
| 2016/0204612 A1* | 7/2016 | Brogan | H02M 7/53871 307/82 |
| 2017/0284370 A1 | 10/2017 | Gensior | |
| 2018/0119674 A1* | 5/2018 | Kjær | H02J 3/46 |
| 2019/0348902 A1 | 11/2019 | Heyen | |
| 2020/0381991 A1 | 12/2020 | Gensior | |

* cited by examiner

METHOD FOR CONTROLLING A CONVERTER

BACKGROUND

Technical Field

The present invention relates to a method for controlling a converter, in particular a power converter of a wind power installation.

Description of the Related Art

In the field of generators of electrical energy, in particular in the case of wind power or photovoltaic installations. It is customary for a plurality of converters or converter modules to be connected in parallel in order to increase the total power of the converter system.

In order to prevent circulating currents within this converter system, measures have to be implemented which at the same time do not qualitatively or quantitatively reduce the power output of the converter system.

When controlling converter systems, it is thus necessary to take account of a large number of criteria, such as, e.g., compliance with limit values for the link circuit voltage, potential circulating currents or network-side requirements.

What is disadvantageous about previously known methods is the lack of coordination of the switching actions beyond the limit of the converter modules.

BRIEF SUMMARY

Provided is a method for controlling converter systems having a plurality of parallel converter modules, to control them in a coordinated manner. Provided is a method for controlling a converter, in particular a power converter of a wind power installation, said converter having a plurality of, preferably parallel, converter modules, and to a generator of electrical energy having such a converter, in particular a wind power installation having such a converter.

Provided is a method for controlling a converter, in particular power converter of a wind power installation, said converter having a plurality of, preferably parallel, converter modules, the method comprising the following steps: driving a first converter module, such that the converter module generates a first electrical AC current in a first switch position, driving a second converter module, such that the converter module generates a second electrical AC current in a second switch position, superposing the first electrical AC current and the second electrical AC current to form a total current, detecting the total current of the converter, determining a virtual current depending on the first and second switch positions, changing the first switch position of the first converter module and/or the second switch position of the second converter module depending on the total current and the virtual current.

In this case, the converter is preferably embodied as a converter system and comprises a plurality of converter modules (e.g., converters) interconnected in parallel with one another, in particular in order that the power output of the converter modules is summed, such that the total power of the converter system is increased. Furthermore, the converter or the converter system is embodied as an inverter of a power converter of a wind power installation.

The converter modules are preferably embodied in three-phase fashion and respectively generate one current per phase. In one preferred embodiment, the converter is thus embodied in three-phase fashion, in particular comprising the three phases p=1, p=2, and p=3.

In one preferred embodiment, the converter is embodied as a so-called power converter and/or as a grid converter. By way of example, for this purpose the converter comprises ten converter modules each having a rated power of 400 kW, such that the converter has a total power of 4 MW. Furthermore, the converter additionally comprises a control unit (e.g., controller) configured to drive the converter modules in such a way that the converter operates in both current- and voltage-impressing fashion on an electrical supply network.

Preferably, for this purpose the first converter module is interconnected in parallel with the second converter module in such a way that the first electrical AC current and the second electrical AC current are superposed to form a common converter current, the total current.

In a first step, the converter modules are driven by a control unit in such a way that the converter modules respectively generate an AC current by means of specific switch positions. These switch positions of a phase can also be combined as the sum of all switch positions $S_{\Sigma p}$ or $S_{\Sigma 123}$, wherein the switch positions of a converter module can each assume, e.g., the discrete states 0 and 1. Preferably, the switch positions are determined individually here for each phase p and for each converter j.

In a next step, the currents generated by the converter modules are superposed to form a total current ig. For this purpose, the converter has, e.g., a node at which the currents generated by the converter modules are superposed in phase, that is to say the current $i_{1,1}$ of the first phase of the first converter module with the current $i_{1,2}$ of the first phase of the second converter module, etc. This results in the three summation currents $I_{g,1}$, $I_{g,2}$, $I_{g,3}$ of the phases 1, 2 and 3, which together form the total current $I_{gp}$ of the converter.

In a next step, said total current $I_{gp}$ of the converter is detected, in particular on the network side, e.g., by a current detector (ammeter) connected to the control unit of the converter. Preferably, the current detector detects the current phase by phase at each output of each converter module in order to determine the total current $i_{gp}$.

In addition, a virtual current $i_v$ is determined depending on the switch positions. For this purpose, e.g., all switch positions of all converter modules are summed. For this purpose, each switch has, e.g., a discrete switch position +1 or −1, which is summed to form a sum. This sum is then used to determine a virtual current $i_v$, e.g., by means of an integration, in particular by integrating the sum of all switch positions. The virtual current thus reproduces in particular a specific state of all switch positions of all converter modules of the converter. The virtual current additionally has in particular the task of decoupling the switch positions from one another, preferably phase by phase, in particular in order to satisfy the mutually separate converter and network requirements. The virtual current is thus preferably used in particular to decouple the switches of one phase from the switches of another phase.

The switch positions of the converter modules or of the converter are subsequently changed depending on the detected total current and the virtual current.

Preferably, a cascaded closed-loop control arrangement having a superordinate and a subordinate closed-loop control arrangement is used for changing the first switch position and/or the second switch position.

In this case, the superordinate closed-loop control arrangement is used in particular to determine the switch positions $S_{\Sigma 123}$ of the converter.

In the case of a parallel connection of, e.g., n two-level power converters as converter modules, each component of $S_{\Sigma 123}$ can assume values from the set $S=\{-n;-n+2;\ldots;n\}$. The choice of the values, separately for each phase owing to the decoupling by means of the virtual current $i_v$, is left to a tolerance band controller or a control block which chooses from a previously effected preselection, namely of the values $s_{\Sigma p}^+$ and $s_{\Sigma p}^-$, in each case the value which reduces the magnitude of the control deviation. In this case, the preselection is fashioned such that the magnitude of the derivative of the control error is as small as possible. This ensures the longest possible times between switching actions and thus reduces the switching losses.

In this case, the subordinate closed-loop control arrangement is used in particular to distribute the summation switch positions effected in the preselection along the converter modules and to set the individual currents of the converters in the process.

Preferably, the subordinate closed-loop control arrangement is embodied such that the currents in the individual converter modules do not deviate from one another to an excessively great extent, or that a desired load distribution among the converters is ensured. Here, too, each phase can be considered separately from the others, which enables the processing to be parallelized.

In one preferred embodiment, the switch positions of one and/or all converter modules are determined in parallel.

In a further preferred embodiment, the superordinate closed-loop control arrangement and the subordinate closed-loop control arrangement each comprise at least one hysteresis closed-loop control arrangement or are embodied as tolerance band controllers.

Preferably, detecting the total current is effected by detecting each current of each phase of each converter module.

What is therefore proposed in particular is that the total current is not detected directly, but rather is detected indirectly. For this purpose, at the output of each converter module the corresponding current of the converter module in each phase is detected and subsequently summed to form the total current. For this purpose, the current detector of each converter module is preferably used, said current detector preferably being connected to the controller of each converter module. The controllers of the converter modules are additionally preferably connected to the control unit of the converter.

Preferably, changing the first switch position of the first converter module and/or the second switch position of the second converter module is effected by means of control signals.

For this purpose, the converter has, e.g., a control unit connected to the controllers of the converter modules. The control unit carries out the method described above and below, and communicates the specific switch positions to the converter modules by means of control signals.

What is therefore proposed in particular is for the switch positions to be transferred to the controllers of the converter modules explicitly by the control unit of the converter. As a result, the controllers of the converter modules do not have to perform complex calculations.

In a further preferred embodiment, the control signals comprise the explicit switch positions of the power electronic switches with a dead time. Alternatively, the control signals comprise the switch positions of a half-bridge (of two power electronic switches) and the switch positions of the power electronic switches with a dead time are inserted by the controllers of the converter modules.

Preferably, changing the first switch position of the first converter module and the second switch position of the second converter module is effected depending on a sum of the switch positions of a phase over all converter modules, in particular using a tolerance band.

What is therefore also proposed, in particular, is that the converter modules are controlled phase by phase by means of tolerance bands. This means, in particular, that each phase of a converter module is controlled by way of a respective tolerance band, but in particular such that the switch position required in total is still ensured phase by phase.

Preferably, the sum of the switch positions of a phase is determined from at least one of the following list:
a summation current of a phase over all converter modules;
the virtual current;
a rounding function for the switch positions;
a reference value for the virtual current;
a reference value for a total current of a phase of all converter modules.

The function for the switch positions, comprising a rounding function, can be described, e.g., as:

$$s_{\Sigma p}^{\mp} = \pm 2\left[\pm \frac{1}{2}\left(\left(V_{gp} - V_0 + L_{\alpha\beta}\left(\frac{d}{dt}i_{gp}^* + \frac{d}{dt}i_v^*\right) \pm V_{res}\right)\frac{2n}{U_c} + n\bmod 2\right)\right] - n\bmod 2,$$

wherein $\lfloor \cdot \rfloor$ describes or designates the rounding function where: $V_{gp}$=network voltage, in particular of the three phases 1, 2 and 3;
$V_0$=Average value of the three phases of the network voltage;
$L\alpha\beta$=Inductance in $\alpha\beta$-coordinates;
$V_{res}$=Voltage offset The inductance $L\alpha\beta$ can be determined using an inductance matrix that reproduces the topology of the converter, as shown below in FIG. 3, for example, where $$L_c = \begin{pmatrix} L & M & M \\ M & L & M \\ M & M & L \end{pmatrix},$$

wherein
L is the inductance of a phase and M describes the corresponding mutual inductances.

This results in $$L_{\alpha\beta 0} = \mathrm{diag}\,(L_{\alpha\beta}, L_{\alpha\beta}, L_g + (L+2M)/n)$$

where $$L_{\alpha\beta} = L_g + (L-M)/n,$$

$L_g$ here describes the network inductance.

In order to achieve a decoupling, it is proposed, in particular, to use a design parameter of an inductance $L_v$, which corresponds to $L_{\alpha\beta}$ in terms of magnitude. As a result, from $L\alpha\beta v = \mathrm{diag}\,(L\alpha\beta, L\alpha\beta, Lv)$ where $Lv = L\alpha\beta$, it turns out that $L\alpha\beta v = L\alpha\beta * I$, wherein I is the identity matrix. It is therefore proposed, in particular, to achieve a complete decoupling by the choice of a corresponding parameter|.

The voltage offset $V_{res}$ can also be referred to as a voltage error and is preferably used as a controller parameter in order to ensure controller safety. A voltage offset $V_{res}$ of greater than zero is preferably chosen.

In order to prevent $s_{\Sigma p}$ from being switched over excessively frequently, a hysteresis is preferably implemented such that the same switch position is used until $|e_p|>h_\Sigma$, e.g., by means of a time-discrete implementation in accordance with $$s_{\Sigma p}[k] = \begin{cases} s_{\Sigma p}^- & \text{for } e_p[k] > h_\Sigma \\ s_{\Sigma p}^+ & \text{for } e_p[k] > h_\Sigma \\ s_{\Sigma p}[k-1] & \text{otherwise} \end{cases}$$

Such an implementation results in smaller absolute values in the derivative $$\frac{d}{dt}e_p,$$

which are particularly advantageous for maintaining trajectory tracking of the reference currents.

The virtual current $i_v$ is furthermore used, in particular, to minimize or to optimize downward the required link circuit voltage in the converter. Better utilization of the converter is made possible as a result.

The reference value for the total current of a phase $i^*_{gp}$ is used as a target value and is preferably set so as to give rise to symmetrical network currents. Preferably, changing the first switch position of the first converter module and/or the second switch position of the second converter module is effected depending on a reference value for a current of a phase of a converter, in particular using a tolerance band.

It is therefore proposed, in particular, additionally to use reference values for the individual phases of the individual converters.

These reference values can be used in the subordinate closed-loop control arrangement, in particular.

By way of example, the superordinate closed-loop control arrangement stipulates how many switches are intended to be switched. The subordinate closed-loop control arrangement, on the basis of the reference values, then selects which are the corresponding switches to be switched.

In one case, for example, one reference value for a current of one phase of a converter is 1 kA and another reference value for another phase of a converter is 2 kA. As a result of the switching of the corresponding switches, the converters would each generate 2 kA. The subordinate closed-loop control arrangement compares these values and in the latter case ascertains a smaller deviation and therefore switches this switch or therefore switches this converter module (on).

The selection of which of the converter modules is intended to be switched on or switched makes it possible to influence the division of the network current among the individual converters. In one preferred embodiment, a prioritization for switching (on) the converter modules takes place, which preferably takes account of the following:
- whether a band around the reference or the reference value $i^*_{cp,j}$ was detected as being exceeded or undershot,
- the current $i_{cp,j}$,
- the present switch position $s_{p,j}$ and
- further status information, e.g., indicating whether a switch was blocked for a change of the switching position because it had possibly only just been actuated, or signaling whether a switch was deactivated but is still participating in carrying current.

Provided is a generator of electrical energy, comprising a converter having a plurality of, preferably parallel, converter modules, a control unit for driving the converter modules of the converter, wherein the control unit is configured to change the switch positions of the converter modules and to carry out a method as described above or below.

Preferably, the generator of electrical energy is a wind power installation, in particular wherein the converter is embodied as a power converter with at least 3 MW.

In a further preferred embodiment, the converter modules are embodied substantially identically.

BRIEF DESCRIPTION OF THE SEVERAL VIEWS OF THE DRAWINGS

The present invention will now be described in greater detail below with reference to the accompanying figures, wherein the same reference signs are used for identical or similar components or assemblies.

DETAILED DESCRIPTION

Figure 1:
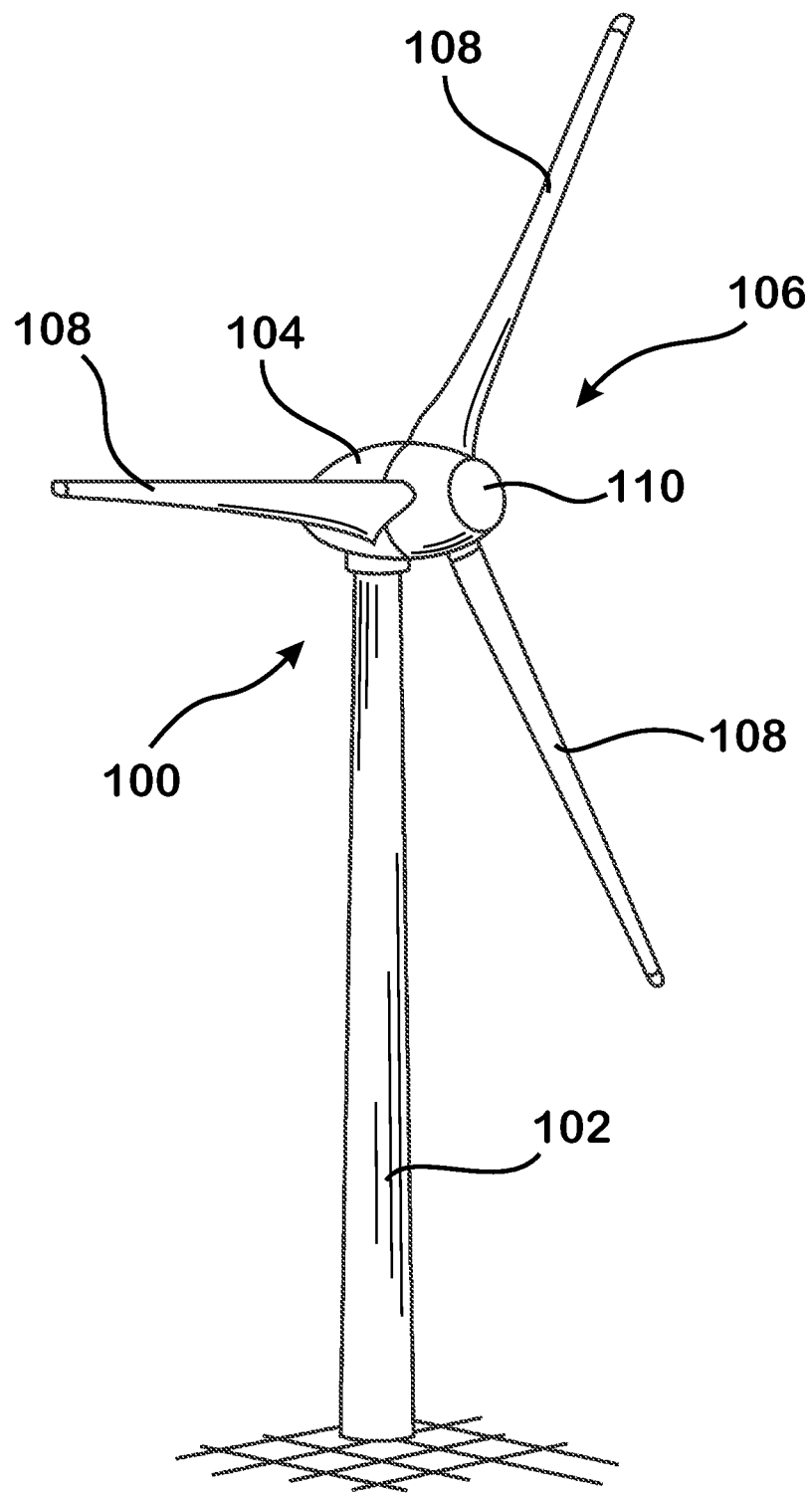
FIG. 1 shows schematically and by way of example a perspective view of a wind power installation in one embodiment.

FIG. 1 shows a perspective view of a wind power installation 100.

In this respect, the wind power installation 100 has a tower 102 and a nacelle 104. An aerodynamic rotor 106 comprising three rotor blades 108 and a spinner 110 is arranged on the nacelle 104. The rotor 106 is caused to effect a rotational movement by the wind during operation and thereby drives a generator in the nacelle. As a result, the generator generates a current to be fed in, which is fed into an electrical supply network by means of an inverter.

Figure 2:
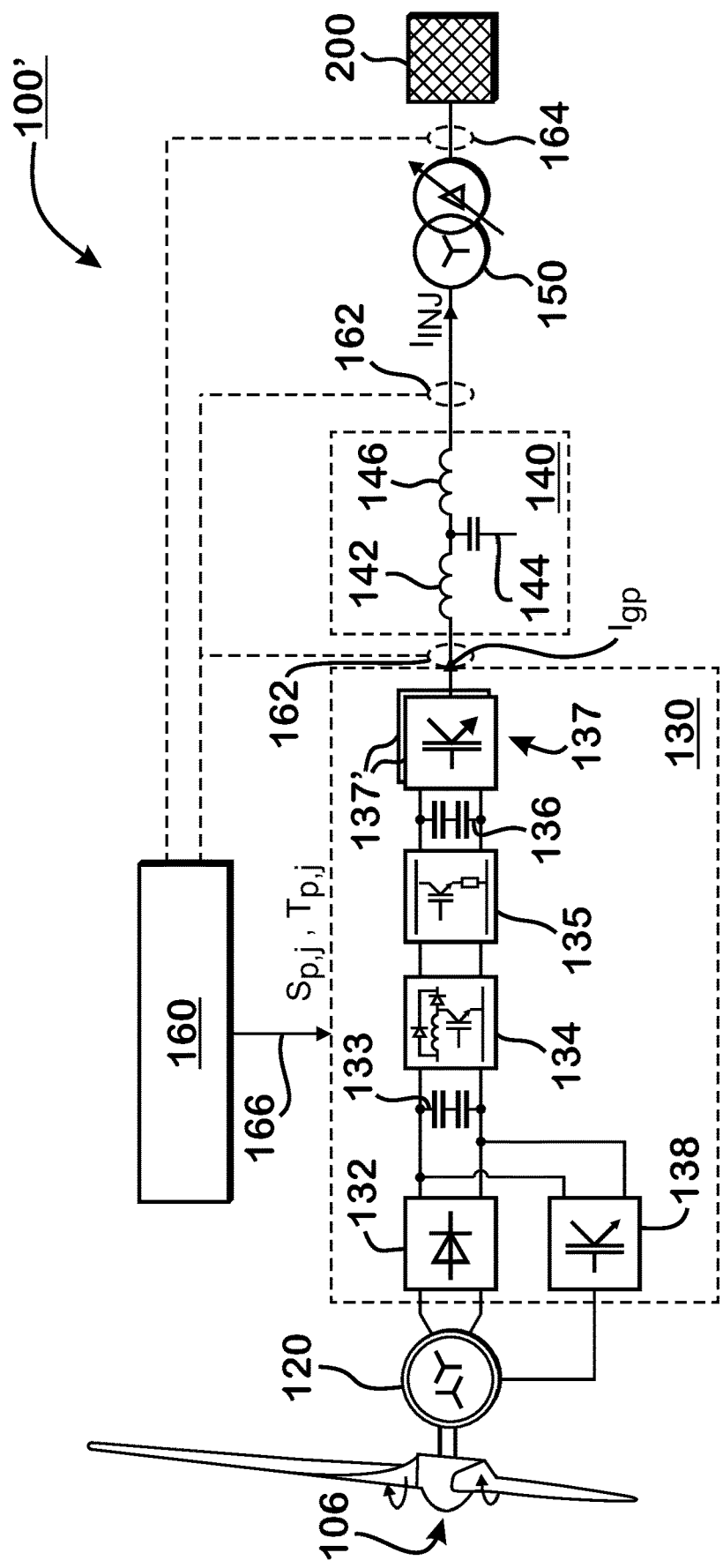
FIG. 2 shows schematically and by way of example a construction of an electrical phase section of a wind power installation in one embodiment.

FIG. 2 shows schematically and by way of example an electrical phase section 100' of a wind power installation 100, as preferably shown in FIG. 1.

The aerodynamic rotor of the wind power installation 106 is connected to the generator 120 of the wind power installation. In this case, the generator 120 is preferably embodied as a six-phase ring generator.

The generator 120 is furthermore connected to an electrical supply network 200, or linked to the electrical supply network 200, via a converter 130 by means of a network protection device 140 and a transformer 150.

Figure 3:
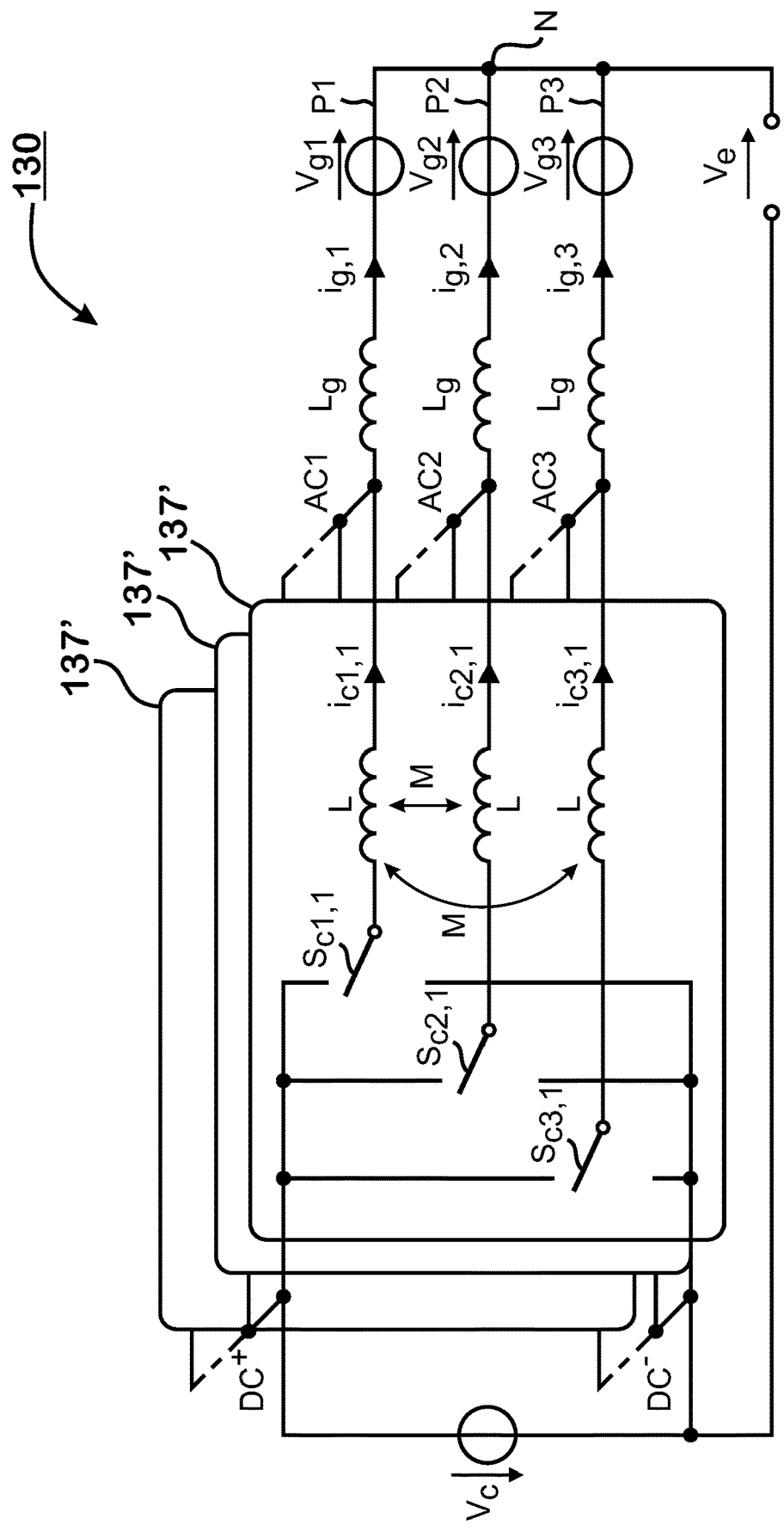
FIG. 3 shows schematically and by way of example the construction of a converter.

In order that the electrical power generated by the generator 120 is converted into a current Ig to be fed in, the converter 130 has a rectifier 132 at the converter input. The rectifier 132 is additionally connected to a first DC voltage link circuit 133. The first DC voltage link circuit 133 in turn is connected to a boost controller 134. The boost controller 134 is in turn connected to a chopper 135. The chopper 135 is in turn connected to a second DC voltage link circuit 136. The second DC voltage link circuit 136 is in turn connected to an inverter 137. In this case, the inverter 137 itself forms the converter output, which is provided with a network protection device 140. In this case, the inverter 137 consists of a plurality of inverter modules 137', as shown in FIG. 3, for example, and generates a total current $i_{gp}$.

The network protection device 140 comprises a decoupling inductor 142, a filter 144 and a network inductor 146, for example. In one preferred embodiment, the network protection device 140 is thus embodied as an LCL filter. The network protection device 140 thus forms a current $I_{INJ}$ to be fed in from the total current $i_{gp}$ generated.

In order that the current $I_{INJ}$ to be fed in is fed into the electrical supply network 200, a wind power installation transformer 150 is furthermore provided, which is preferably star-delta-connected.

The electrical supply network 200 to which the wind power installation 100 is linked by means of the transformer 150 can be a wind farm network or an electrical supply or distribution network, for example.

Furthermore, a control unit (controller) 160 is provided for controlling the electrical phase section 100'.

The control unit 160 is configured to detect the total current $i_{gp}$ generated and/or the current $I_{INJ}$ to be fed in by means of a current detecting means (ammeter, voltmeter, multimeter or current sensor) 162. Preferably, in particular, the currents of each converter module 137' in each phase are detected.

Moreover, the control unit also has voltage detecting means (voltmeter, multimeter or voltage sensor) 164 configured to detect a network voltage of the electrical supply network 200.

In one particularly preferred embodiment, the control unit 160 is additionally configured also to detect the phase angle and the amplitude of the current $I_{inj}$ to be fed in.

From the values thus detected, the control unit 160 subsequently determines the switch positions $S_{p,j}$ by means of a method described herein.

In addition, the control unit 160 can furthermore be configured to determine, in addition to the switch positions $S_{p,j}$, corresponding dead times $T_{p,j}$ for the individual switches of the converter modules 137'.

The control unit then transfers the switch positions $S_{p,j}$, and the dead time $T_{p,j}$ to the corresponding controllers of the converter modules.

FIG. 3 shows schematically and by way of example the construction of a converter 130, in particular of the inverter 137 of a wind power installation, preferably as shown in FIG. 2.

The inverter 137 comprises three inverter modules 137', which are representative of a plurality of inverter modules 1, 2, ..., n.

On the DC voltage side, the inverter modules 137' are connected to a link circuit voltage $V_c$ by way of a DC voltage link circuit.

The link circuit voltage $V_c$ has a positive potential $DC^+$ and a negative potential $DC^-$, which are preferably substantially equal in terms of magnitude.

Furthermore, on the AC voltage side, the inverter modules 137' are connected to the phases P1, P2, P3 via a three-phase AC voltage network. In this case, the phases P1, P2, P3 can also be understood in a simplified way as phase p with consecutive numbering 1, 2, 3.

The phases p each have an inductance L and a magnetic coupling M and are star-connected by means of a star point N, which carries a neutral conductor with a voltage $V_e$.

Each converter module 137' has a switch $S_{cp,j}$ for each phase p, wherein the switch $S_{c1,1}$ $S_{c2,1}$ and $S_{c3,1}$ can assume the discrete values +1 and −1. As a result, each converter module 137' generates a current $i_{c1,j}$ per phase p. The first converter module thus generates the current $i_{c1,1}$ in the first phase P1, the current $i_{c2,1}$ in the second phase P2 and the current $i_{c3,1}$ in the third phase.

The currents $i_{c1,j}$ thus generated are combined by means of nodes AC1, AC2, AC3 in each phase P1, P2, P3 to form a respective summation current $i_{g,1}$, $i_{g,2}$, $i_{g,3}$, which yield the total current $i_{gp}$.

Each phase P1, P2, P3 additionally has a total inductance $L_g$ and a voltage $V_{g1}$, $V_{g2}$, $V_{g3}$.

Figure 4:
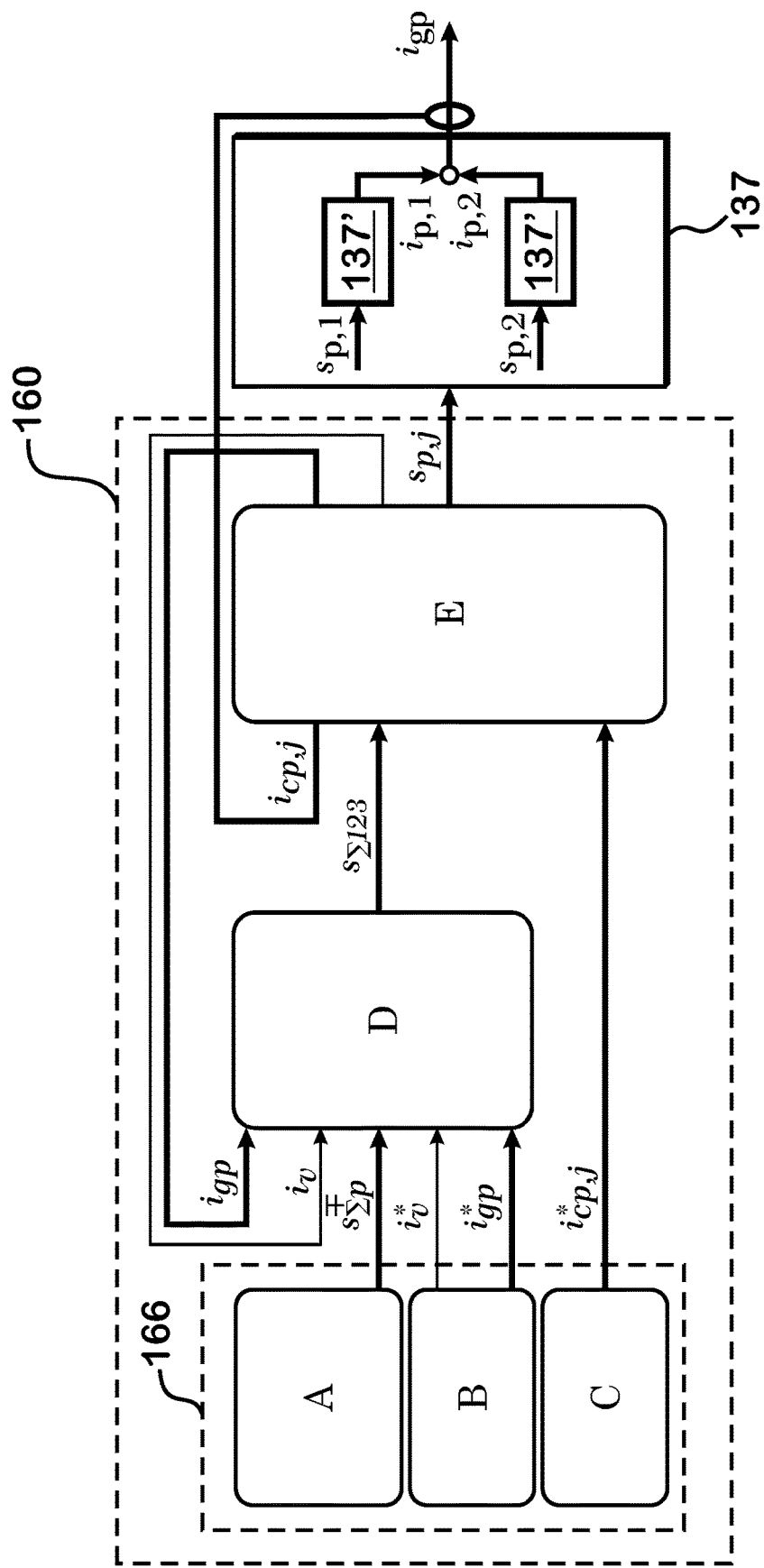
FIG. 4 shows schematically and by way of example the construction of a control unit of a converter.

FIG. 4 shows schematically and by way of example the construction of a control unit 160 of a converter, in particular as shown in FIG. 3.

The converter is embodied as an inverter 137 and has a plurality of inverter modules 137', which respectively generate a three-phase current $i_{p,1}$, $i_{p,3}$, which are superposed to form a total current $i_{gp}$.

The inverter 137 or that is to say the inverter modules 137' are controlled, by means of the control unit 160, by switching signals for the switches in the form of the switch positions $S_{p,j}$ to be adopted. As a result, the first inverter module 137' thus has the switch positions $S_{p,1}$, and the second inverter module 137' the switch positions $S_{p,2}$.

It is thus proposed first of all to operate the inverter modules 137' as a connected assemblage, in particular to operate them in parallel.

The control unit 160 substantially consists of two closed-loop control arrangements, namely of a superordinate closed-loop control arrangement A, B, D and a subordinate closed-loop control arrangement C, E.

In this case, the superordinate closed-loop control arrangement A, B, D substantially has the task of determining how much has to be switched in order to fulfill specific target values. In this case, the subordinate closed-loop control arrangement C, E substantially has the task of determining what has to be switched in order that the inverter modules 137' are loaded as uniformly as possible and/or are not overloaded. As a criterion for the former, use is made, e.g., of a reference value to be attained for the total current $i^*_{gp}$, which can also be referred to as target total current. As a criterion for the latter, use is made, e.g., of a reference value $i^*_{cp,j}$ not to be exceeded for a current of a phase of a converter module.

For this purpose, the superordinate closed-loop control arrangement A, B, D has a selection block A, a reference block B and a tolerance band block D.

The selection block A effects a preselection, e.g., by means of the equation:

$$s^{\mp}_{\Sigma p} = \pm 2 \left[ \pm \frac{1}{2} \left( \left( V_{gp} - V_0 + L_{\alpha\beta} \left( \frac{d}{dt} i^*_{gp} + \frac{d}{dt} i^*_v \right) \pm V_{res} \right) \frac{2n}{V_c} + n \bmod 2 \right) \right] - n \bmod 2$$

and generates therefrom the preselection for an upper value of the switch positions $s_{\Sigma p}^+$ and the preselection for a lower value of the switch positions $s_{\Sigma p}^-$.

The reference block B additionally generates a reference value $i^*_v$ for the virtual current $i_v$, e.g., on the basis of the equation:

$$\frac{d}{dt} i^*_v = -\frac{V_c}{4nL_v} (\min(\{s^*_{\Sigma p} | p = 1, 2, 3\}) + \max(\{s^*_{\Sigma p} | p = 123\})) \text{ where } s^*_{\Sigma p} = \frac{2n}{V_c} \left( V_{gp} - V_0 + L_{\alpha\beta} \frac{d}{dt} i^*_{gp} \right)$$

and a reference value $i^*_{gp}$ for the total current $i_{gp}$.

The reference value $i^*_{gp}$ can be predefined as a target value, e.g., by a power closed-loop control arrangement of the wind power installation or by a network operator.

From these values $s_{\Sigma p}^+$, $s_{\Sigma p}^-$, $i^*_v$, $i^*_{gp}$ and using the virtual current $i_v$ and the total current $i_{gp}$, the tolerance band block D then ascertains the sum of all the switch positions of the converter $S_{\Sigma 123}$ and transfers this as a target predefinition to the subordinate closed-loop control arrangement, in particular the switching block E described below, which ascertains the individual switch positions of the switches of the converter modules from this target predefinition.

For this purpose, the subordinate closed-loop control arrangement C, E has a reference block C and a switching block E.

The reference block C generates a reference value $i^*_{cp,j}$ for each current of a phase of each converter module $i_{cp,j}$. This reference value $i^*_{cp,j}$ takes account, e.g., of a maximum permissible current of the converter module. However, the reference value $i^*_{cp,j}$ can, e.g., also be used to generate a load division within the phases of the converter modules, e.g., in the event of possible thermal problems.

From this reference value $i^*_{cp,j}$ and taking account of the target predefinition $S_{\Sigma 123}$ of the superordinate closed-loop control arrangement, namely the sum of all switch positions of the converter $S_{\Sigma 123}$, the switching block E generates the individual switch position $S_{p,j}$ of each phase p of each converter module j.

Furthermore, from a detected total current $i_{gp}$, which was ascertained, e.g., by means of all currents of all phases of all converter modules $i_{cp,j}$, the switching block E ascertains a virtual current $i_v$, e.g., by means of the equation:

$$L_v \frac{d}{dt} i_v = \frac{V_c}{2n} s_{\Sigma 0}$$

and transfers both the total current $i_{gp}$ and the virtual $i_v$ current to the superordinate closed-loop control arrangement A, B, D, in particular the tolerance band block D.

The subordinate closed-loop control arrangement C, E, in particular the switching block E, thus converts the sum of all switch positions $S_{\Sigma 123}$, said sum having been determined by the superordinate closed-loop control arrangement A, B, D, into the individual switch position $S_{p,j}$. In other words, the superordinate closed-loop control arrangement determines how many converter modules are intended to be switched on, and the subordinate closed-loop control arrangement determines which converter modules are intended to be switched on.

In one preferred embodiment, the reference blocks A, B, C are implemented in a reference module 166, in particular according to the equations:

$$s_{\Sigma p}^{\mp} =$$
$$\pm 2 \left\lfloor \pm \frac{1}{2} \left( \left( V_{gp} - V_0 + L_{\alpha\beta} \left( \frac{d}{dt} i^*_{gp} + \frac{d}{dt} i^*_v \right) \pm V_{res} \right) \frac{2n}{V_c} + n\bmod 2 \right) \right\rfloor - n\bmod 2$$

$$i^*_{123} = T^{-1}(i^*_d \cos(\varphi), i^*_q \sin(\varphi), 0)^T,$$

$$\frac{d}{dt} i^*_v = -\frac{V_c}{4nL_v} (\min(\{s_{\Sigma p}^+ | p = 1, 2, 3\}) + \max(\{s_{\Sigma p}^+ | p = 123\})) \text{ and}$$

$$s_{\Sigma p}^+ = \frac{2n}{V_c} \left( V_{gp} - V_0 + L_{\alpha\beta} \frac{d}{dt} i^*_{gp} \right).$$

The coordination of the parallel converters is thus achieved in particular by the converter modules being operated as an overall system in an approximated sliding regime.

A superordinate closed-loop control arrangement A, B, D and a subordinate closed-loop control arrangement C, E are used for this purpose.

For the superordinate closed-loop control arrangement A, B, D, suitable coordinates are thus chosen (the error coordinates $e_{123}$), at which a tolerance band controller is implemented. The subsystem of the virtual current is concomitantly simulated in the computing unit, but otherwise regarded as part of the controlled system. The introduction of this subsystem is essential for the decoupling of the switch positions $s_{\Sigma 123}$ designating the sum of the switch positions of a phase over all converters. It is taken to mean, in particular, that switching actions of a component of $s_{\Sigma 123}$ affect only the increase in the corresponding component of $e_{123}$.

This superordinate closed-loop controller, the references of which were generated in block B, thus defines only the switch position $s_{\Sigma 123}$ of the multi-level power converter. In the case of a parallel connection of n two-point power converters, each component of $s_{\Sigma 123}$ can assume values from the set $$S = \{-n; -n+2, \ldots, n\}$$

The choice of the values, separately for each phase owing to the decoupling, is left to a tolerance band controller, that is to say block D, for example, which, from a previously effected preselection, namely of the values $s_{\Sigma p}^+$ and $s_{\Sigma p}^-$, chooses in each case the value which reduces the magnitude of the control deviation. The preselection, that is to say block A, for example, is fashioned here such that the magnitude of the derivative of the control error is as small as possible. This ensures the longest possible times between switching actions and thus reduces the switching losses.

In a further embodiment, it is also possible for the tolerance band controller in block D to be equipped with a second, larger hysteresis. At these points the value n or −n is then to be chosen from the set S. This is helpful in cases in which the preselection was effected unfavorably on account of suddenly changing parameters, particularly if the preselection in Block A proceeds with a lower repetition rate than the current controller in block D.

In a further embodiment, the selection of the reference for the virtual current in block B is effected such that the link circuit voltage is utilized in the best possible way.

The subordinate closed-loop control arrangement C, E ensures that the currents in the individual converters do not deviate from one another to an excessively great extent or that a desired load distribution among the converters is ensured. Here, too, each phase can be considered separately from the others, which enables the processing to be parallelized.

For this purpose, firstly references $i_{cp,j}$, p=1,2,3, j=1, 2, ..., n are to be chosen compatibly, which is effected in block C, in particular. The number of converters that are then switched on (the upper semiconductor switch being activated) is as was predefined by the superordinate closed-loop controller; this is preferably done in block E. The selection of which of the n converters are switched on makes it possible to influence the division of the network current among the individual converters.

In a further embodiment, a prioritization for switching on takes place, which takes account of the following:
whether a band around the reference $i^*_{cp,j}$ was determined as being exceeded or undershot, the current $i_{cp,j}$, the present switch position $s_{p,j}$ and further status information, e.g., indicating whether a switch was blocked for a change of the switching position because it had possibly only just been actuated, or signaling whether a switch was deactivated but is still participating in carrying current.

In one preferred embodiment, a rapid communication is additionally set up, such that on a central assembly the measured values of the currents are present after a short latency and the manipulated variables calculated therefrom are calculated there and then communicated to the converters again likewise with low latency.

It is thus proposed that in particular assuming a system shown in FIG. 3, the procedure as follows is adopted:

Since the sum of the switching functions of the individual converter modules is defined by the described control, what remains to be decided is how this directive is intended to be distributed among the converter modules and how the converter modules are intended to limit the internal or circulating currents. The following scheme is therefore introduced for each phase:

Firstly, the reference values for the currents $i^*_{cp,j}$ are defined for each current, such that it holds true that $$\Sigma_{j}^{n}=1 i^*_{cp,j}=i^*_{gp}.$$

This allows the load to be defined individually for each converter.

Secondly, the errors are determined in accordance with $$e_{p,j}=i_{cp,j}-i^*_{cp,j}$$

Thirdly, a list is created in which the converter module indices are stored in the order in which they are intended to be taken into account or switched. Moreover, the following rules are taken into account:

1. $e_i<-h$ and $e_j>-h$, i.e., one converter module is given precedence over another if its lower tolerance band was contravened and the tolerance band of the other was not contravened, or $e_i<h$ and $ej>h$, i.e., one converter module is given precedence over another if its upper tolerance band was not contravened and the tolerance band of the other was contravened, 2. $s_{p,j}=1$ and $s_{p,j}=-1$, i.e., one converter module is given precedence over another if its switch position is +1 and that of the other is −1, 3. $e_i>e_j$, i.e., one converter module is given precedence over another if an error is greater than in the case of the other.

Fourthly, the switch positions are allocated, in accordance with $$s_{p,l1} = \ldots = s_{p,l,k} = 1 \text{ for } s_{\Sigma p} > -n$$

$$s_{p,lk+1} = \ldots = s_{p,l,n} = 1 \text{ for } s_{\Sigma p} > n$$

where $$k = \frac{s_{\Sigma p}+n}{2}.$$

On account of this scheme, the command $s_{\Sigma p}$ generated by the control of the network currents is always maintained and the internal currents are likewise controlled. Preferably, for this purpose, the network currents are accorded a higher priority than the circulating or internal currents.

Figure 5:
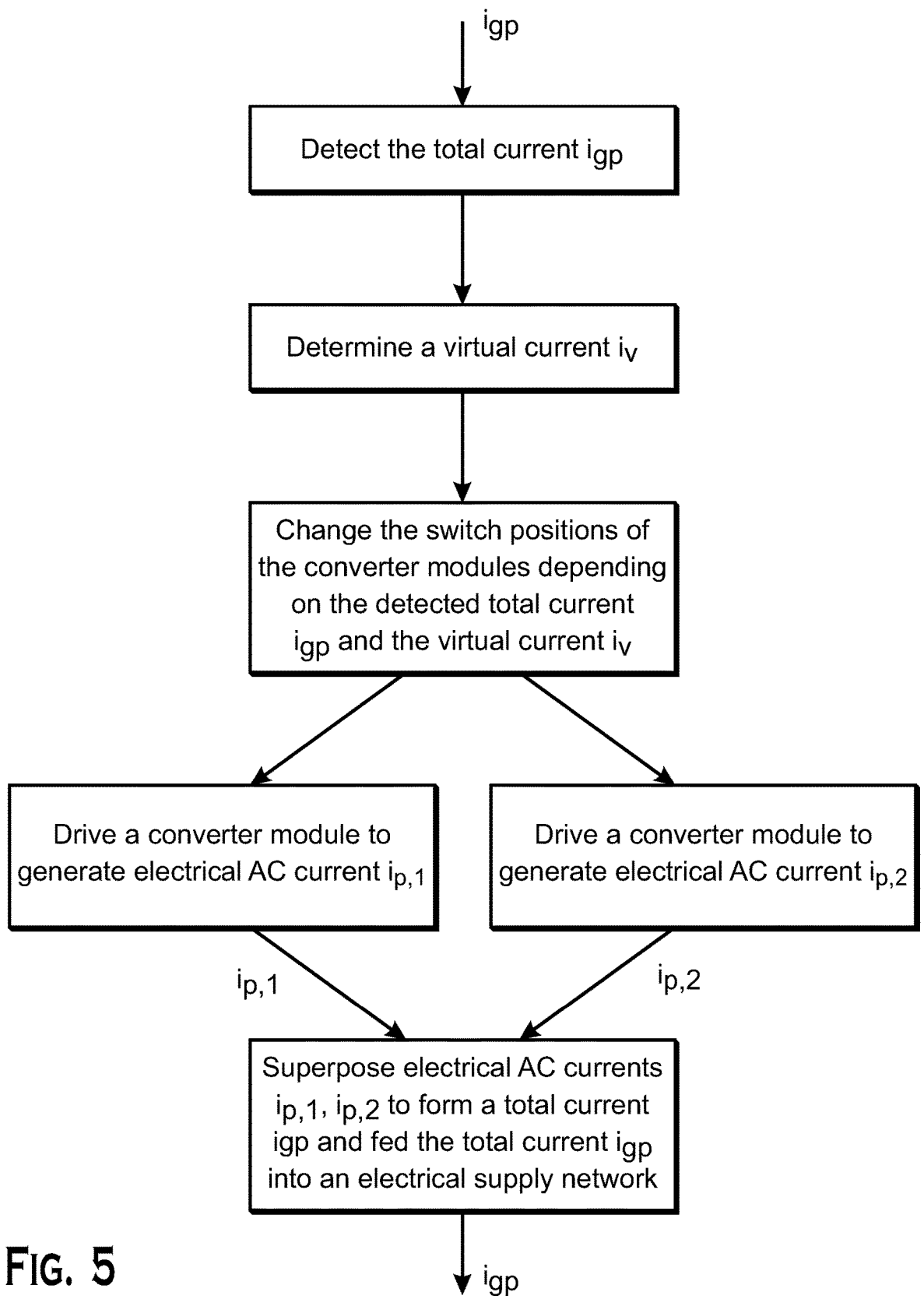
FIG. 5 shows schematically and by way of example the sequence of a method for controlling a converter.

FIG. 5 shows schematically and by way of example the sequence of a method for controlling a converter.

In a first step 2010, 2020, the converter modules are driven in order to generate respectively an electrical AC current $i_{p,1}$, $i_{p,2}$.

In a second step 2030, the electrical AC currents $i_{p,1}$, $i_{p,2}$ are superposed to form a total current $i_{gp}$ and fed into an electrical supply network.

Said total current $i_{gp}$ is detected in a next step 2040.

In addition, a virtual current $i_v$ is determined in a further step 2050.

Subsequently, in a next step 2060, the switch positions of the converter modules are changed depending on the detected total current $i_{gp}$ and the virtual current $i_v$.

This method thus described is carried out continuously during the operation of the converter.

In this case, the method described herein and respectively the control unit described herein afford the following major advantages:

the advantages of sliding regime controllers (implemented here as tolerance band controllers) are maintained (primarily the very good trajectory tracking capability) and coordinated switching actions additionally occur such as can be achieved much more simply for systems with pulse width modulation.

The tolerance bands for the network currents and the individual currents can be predefined independently of one another. That means that the value of the (externally visible) network currents and of the (externally invisible) circulating currents can be parameterized independently of one another.

A desired distribution of the current among the individual converters can be effected (e.g., in order to be able to perform thermal balancing).

It is still possible for the tolerance bands to be chosen in a manner dependent on the network angle.

The failure of a converter can be compensated for almost imperceptibly for the network.

LIST OF REFERENCE SIGNS

100 Wind power installation
100' Electrical phase section of the wind power installation
102 Tower of the wind power installation
104 Nacelle of the wind power installation
106 Aerodynamic rotor of the wind power installation
108 Rotor blades of the wind power installation
110 Spinner of the wind power installation
120 Generator of the wind power installation
130 Converter
132 Rectifier of the converter
133 First DC voltage link circuit of the converter
134 Boost controller of the converter
135 Chopper of the converter
136 Second DC voltage link circuit of the converter
137 Inverter of the converter
137' Inverter module
140 Network protection device of the converter
144 Filter of the network protection device
146 Network inductor of the network protection device
150 Wind power installation transformer
160 Control unit
162 Current detecting means
164 Voltage detecting means
166 Reference module 166
200 Electrical supply network
AC AC current
AC1 Node of a first phase AC2 Node of a second phase
AC3 Node of a third phase
DC DC voltage
DC⁺ Positive potential of the DC voltage
DC⁻ Negative potential of the DC voltage
i Current
I Identity matrix
$i_{cp,j}$ Current of a phase of a converter module
$i^*_{cp,j}$ Reference value for a current of a phase of a converter module
$i_{gp}$ Total current of the converter
$i^*_{gp}$ Reference value for the total current of the converter
$i_{g,1}$ Total current of the converter in a first phase
$i_{g,2}$ Total current of the converter in a second phase
$i_{g,3}$ Total current of the converter in a third phase
$i_v$ Virtual current
$i^*_v$ Reference value for the virtual current
L Inductance, in particular of a phase
$L_g$ Network inductance
$L_v$ Design parameter of an inductance for decoupling
M Magnetic coupling, in particular of one phase to another phase
N Star point
S Switch position
$S_{cp,j}$ Switch
$S_{p,j}$ Switch position of a phase p of a converter module j
$s_{\Sigma p}^+$ Preselection for upper value of the switch positions
$s_{\Sigma p}^-$ Preselection for lower value of the switch positions
$S_{\Sigma 123}$ Sum of all switch positions of the converter
$T_{p,j}$ Dead time for a switch position $S_{p,j}$ of a phase p of a converter module j
v, V Voltage
$V_c$ Link circuit voltage
$V_e$ Displacement voltage between link circuit and neutral point
A, B, D Superordinate closed-loop control arrangement
A Selection block of the superordinate closed-loop control arrangement
B Reference block of the superordinate closed-loop control arrangement
D Tolerance band block of the superordinate closed-loop control arrangement
C, E Subordinate closed-loop control arrangement
C Reference block of the subordinate closed-loop control arrangement
E Switching block of the subordinate closed-loop control arrangement

INDICES 1, 2, Consecutive numbering
c Current
g Total current
j Number of the converter
p Number of the phase
v Virtual
Σ Sum
α, β, Coordinate The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling a converter having a plurality of converter modules, the method comprising:
driving a first converter module to generate a first electrical AC current in a first switch position;
driving a second converter module to generate a second electrical AC current in a second switch position;
superposing the first electrical AC current and the second electrical AC current to form a total current;
detecting the total current of the converter;
determining a virtual current depending on the first and second switch positions; and
changing the first switch position of the first converter module and/or the second switch position of the second converter module depending on the total current and the virtual current.

2. The method as claimed in claim 1, wherein the converter is a power converter of a wind power installation.

3. The method as claimed in claim 1, wherein the plurality of converter modules are coupled in parallel to each other.

4. The method as claimed in claim 1, wherein the first converter module is coupled in parallel with the second converter module such that the first electrical AC current and the second electrical AC current are superposed to form a common converter current.

5. The method as claimed in claim 1, comprising:
using cascaded closed-loop control having superordinate closed-loop control and subordinate closed-loop control to change the first switch position and/or the second switch position.

6. The method as claimed in claim 1, wherein detecting the total current includes detecting a plurality of currents respectively corresponding to a plurality of phases of each converter module of the plurality of converter modules.

7. The method as claimed in claim 1, comprising:
using control signaling to change the first switch position of the first converter module and/or the second switch position of the second converter module.

8. The method as claimed in claim 1, comprising:
changing the first switch position of the first converter module and the second switch position of the second converter module depending on a sum of switch positions of a phase for all converter modules of the plurality of converter modules.

9. The method as claimed in claim 8, comprising:
changing the first switch position of the first converter module and the second switch position of the second converter module depending on the sum of the switch positions using a tolerance band.

10. The method as claimed in claim 8, wherein the sum of the switch positions of the phase is determined from at least one of:
a summation current of a phase over all converter modules of the plurality of converter modules;
the virtual current;
a function for the switch positions using a rounding function;
a reference value for the virtual current; and
a reference value for a total current of a phase of all converter modules of the plurality of converter modules.

11. The method as claimed in claim 1, comprising:
changing the first switch position of the first converter module and/or the second switch position of the second converter module depending on a reference value for a current of a phase of the converter.

12. The method as claimed in claim 11, comprising:
changing the first switch position of the first converter module and/or the second switch position of the second converter module depending on the reference value for the current of the phase of the converter using a tolerance band.

13. A generator of electrical energy of a wind power installation, comprising:
a converter having a plurality of converter modules;
a controller configured to drive the plurality of converter modules by at least:
  driving a first converter module of the plurality of converter modules to generate a first electrical AC current in a first switch position;
  driving a second converter module of the plurality of converter modules to generate a second electrical AC current in a second switch position;
  detecting a total current of the converter, wherein the total current is formed by superposition of the first electrical AC current and the second electrical AC current;
  determining a virtual current depending on the first and second switch positions; and
changing the first switch position of the first converter module and/or the second switch position of the second converter module depending on the total current and the virtual current.

14. The generator as claimed in claim 13, wherein the plurality of converter modules are coupled in parallel.

* * * * *